July 9, 1968  H. H. SCHULZ  3,391,886
COLLAPSIBLE STAND FOR ARTIFICIAL TREES AND THE LIKE
Filed Nov. 23, 1966
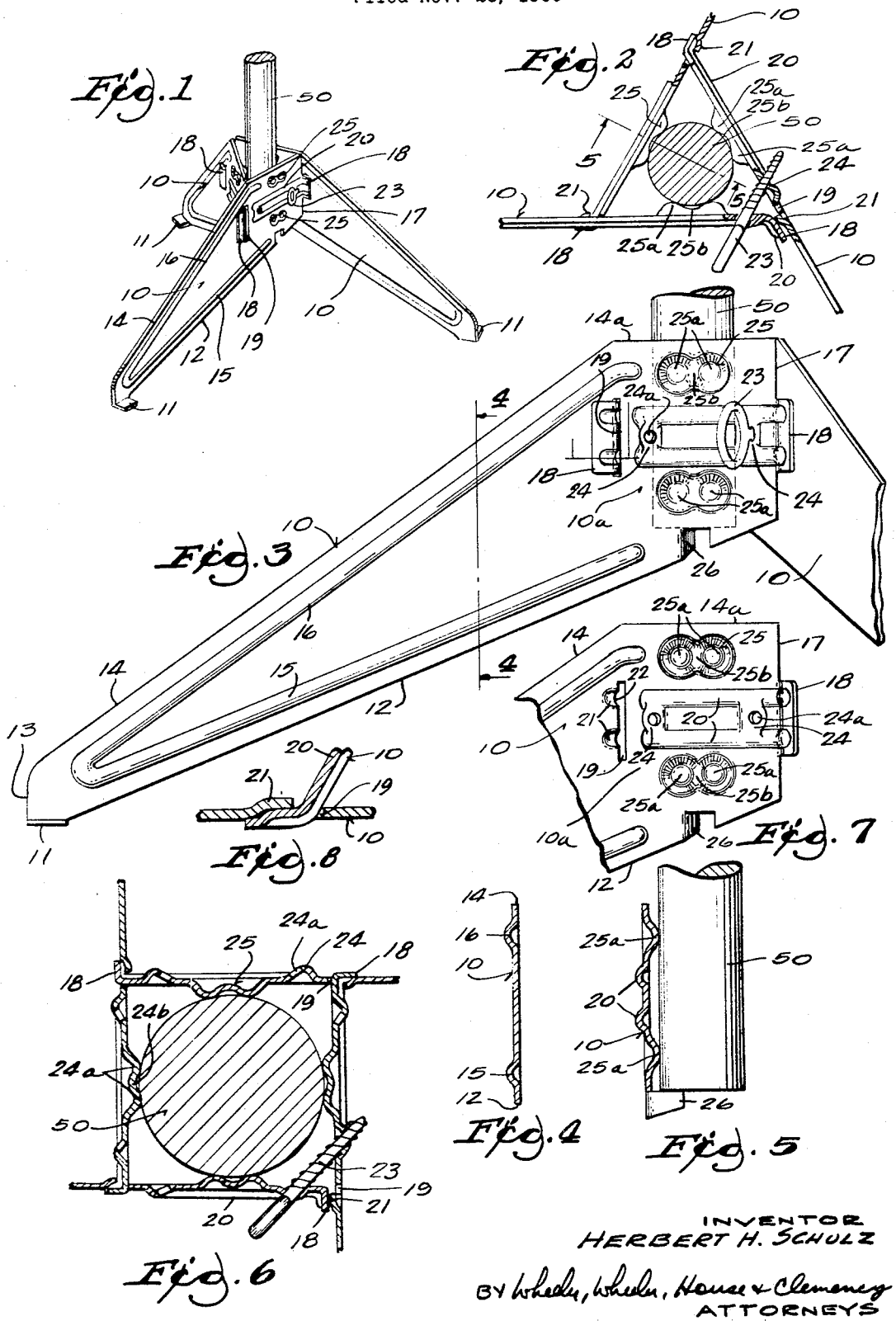
INVENTOR
HERBERT H. SCHULZ
BY Wheeler, Wheeler, House & Clemency
ATTORNEYS United States Patent Office 3,391,886
Patented July 9, 1968

3,391,886
COLLAPSIBLE STAND FOR ARTIFICIAL
TREES AND THE LIKE
Herbert H. Schulz, Wauwatosa, Wis., assignor to S-B
Manufacturing Company, Milwaukee, Wis., a partnership of Wisconsin
Filed Nov. 23, 1966, Ser. No. 596,517
5 Claims. (Cl. 248—48)

ABSTRACT OF THE DISCLOSURE

My stand is so designed as to provide a series, usually three, of identical leg members each having a tongue at the end and a slot spaced from the tongue to receive the tongue of an adjacent leg. This structure permits assembly of my stand with a single screw connecting two of the legs at the point where the tongue and slot connection occur on the remainder of the legs. Each of my novel legs is provided with upper and lower raised bosses each having a curved surface adapted to grip the surface of the vertical post being mounted, and apply very high pressure thereto at vertically spaced points upon tightening of the single screw. Thus tightening of the screw perfoms the dual function of assembling the stand and applying pressure to the post at peripherally spaced points in two horizontal planes which are vertically spaced from each other. Each leg is further provided with an inwardly directed tab which supports the bottom of the post being mounted.

Summary of the invention

The primary inventive features of my device include the raised bosses which grip the post in vertically spaced horizontal planes, and the complementary tongue and slot structures which permit simple assembly, positive locking, and high pressures on the post upon tightening a simple fastening. Also, the screw receiving bosses are of such form that the screw which locks the device in assembled condition also locks it in a compact stack of legs, using the same pierced bosses.

Objects of the invention

It is these features which lead to the advantages of my invention. The object of the invention is provide an improved stand for use in mounting Christmas trees, flag poles, or the like, and to provide a mounting base which is collapsible to the smallest possible dimensions and which has improved means for retaining a vertical cylindrical member such as a tree trunk or a post in a very secure grip, while at the same time simplifying the assembly and improving the attractiveness of the stand or mounting base. These objects are carried out in a structure requiring only one type of stamped leg, and a screw.

In the drawings—

FIG. 1 is a perspective view of my improved stand with a post mounted therein.

FIG. 2 is a top plan view of my stand with a post mounted therein, the post and portions of the stand being shown in horizontal cross section.

FIG. 3 is a greatly enlarged side elevational view of my stand with a portion of one leg broken away.

FIG. 4 is a cross-sectional view on line 4—4 of FIG. 3.

FIG. 5 is a cross-sectional view on line 5—5 of FIG. 2, showing the post in full lines.

FIG. 6 is a horizontal cross-sectional view of the stand of my invention showing four legs assembled together to form a stand for a larger vertical post.

FIG. 7 is an enlarged fragmentary side elevational view of one leg of my stand showing details of the attachment slot.

FIG. 8 is a cross-sectional view on line 8—8 of FIG. 3.

Description

As shown in the drawings, my stand consists of a number of identical legs 10 provided with tabs 11 at their outer ends which serve as feet. The bottom margin 12 of the leg extends from the foot tab 11 upwardly at a slight angle from the horizontal toward the portion of the leg which engages the other legs and clamps the post 50. Extending upwardly from the outer end of tab 11 is a short end 13 which curves at the top into the top margin 14 of the leg. The top margin 14 of leg 10 extends upwardly at a greater angle to the horizontal than a lower margin 12 but still at a relatively small angle to the horizontal, terminating in a short horizontal portion 14a overlying the portion of leg 10 which engaes the other legs and which clamps the post 50. The leg is desirably provided with a lower stiffening rib 15 and an upper stiffening rib 16, which stiffening ribs generally follow the margins 12 and 14 respectively of each leg 10.

The portion of leg 10 which is located centrally of the stand when the stand is assembled and which is provided with means for attaching the legs to each other and for engaging the post 50 will be designated hereafter as the attachment portion 10a of each leg 10.

The attachment portion 10a of each leg 10 terminates in a generally vertical margin 17 and is provided with a tongue 18. At the other end of the attachment portion 10a, generally beneath the area where inclined margin 14 blends into horizontal portion 14a of the upper margin, portion 10a is provided with a vertical slot 19 of a size adapted to receive tongue 18 of another leg 10. As best shown in FIGS. 1, 2, 3 and 7 a pair of additional stiffening ribs 20 extend generally horizontally from the slot 19 to a point adjacent the outer end of tongue 18. The other side of slot 19 from the pair of ribs 20 is provided with extensions 21 of ribs 20 which, however, are convex in the opposite direction from the plane of the sheet which forms the body of each leg 10. Furthermore, the slot 19 is provided with a pair of enlargements or bays 22 corresponding in width to the extensions 21 of ribs 20. This width is slightly greater than the widths of ribs 20 themselves (see FIG. 8). The overall effect of the structure just described is that the ribs 20 extend out onto tongue 18 and stiffen it. The shape of the tongue with the stiffening ribs is accommodated in slot 19 by reason of bays 22. Tongues 18 extend at an angle to the plane of the remainder of each leg 10, the angle preferably being calculated to permit the tongue to lie generally flat against the side of leg 10 in the assembled condition. The ribs 20 on tongue 18 are accommodated in this position by rib extensions 21 which as noted previously are greater in width than ribs 20 so that they nest snugly in assembled relation (FIG. 8). Tongue 18 and slot 19 are thereby given a key and a keyhole relationship which exists only for one angle of insertion of tongue 18 into slot 19. This angle is different than the angle which exists between legs 10 when they are fully assembled, and the polygon is thus locked when assembled.

The angle is also different from the angle at which the last tongue 18 can be brought into the last slot 19 to assemble the polygon formed by attaching portions 10a. The final connection that closes the polygon formed by leg attachment portions 10a is made by means of a screw such as a self-tapping metal screw, a screw eye 23, or a bolt and nut, or other fastener. A screw threaded fastener is preferred. The rectangular area bounded by ribs 20, slot 19 and the base of tongue 18 is provided with a pair of inclined screw bosses 24 which are tilted with respect to the plane of leg attachment portion 10a, each being provided with a central hole 24a to receive a fastener. These bosses 24 are respectively oppositely inclined to the plane of attachment portion 10a, so that when the stand is assembled the bosses are generally parallel (see FIG. 2). A fastener, preferably screw threaded, such as screw eye 23, is screwed through the generally parallel holes 24a in bosses 24 to bring the last tongue 18 over rib extensions 21, rather than assembling the last tongue 18 through the last slot 19 (see FIG. 2).

This arrangement of screw bosses also permits the stand to be locked in disassembled position by stacking the identical legs and inserting a screw or the like through the stacked screw bosses. Because of the angular relation of each boss to the plane of the leg, and because of the stiffening ribs, which nest when stacked, there is no tendency for the legs to pivot out of stacked relationship.

Each leg attachment portion 10a is provided with upper and lower post engaging bosses 25, each of which is provided with two peaks 25a, in the preferred form, to form a post-engaging saddle 25b between them. One boss 25 is at the top of leg attachment portion 10a and the other is at the bottom, the bosses being in line vertically when the stand is assembled. Since each leg 10 is provided with a pair of bosses 25 having peaks 25a spaced horizontally, the upper peaks 25a and saddles 25b form a peripheral series about post 50. Thus, the post is gripped in two horizontal planes by separate peripheral series of peaks and saddles. Considerable force is developed between the peaks 25a and the post 50 by reason of the fact that final assembly is made with a screw or other threaded fastener 23. The use of a screw threaded fastener provides a great mechanical advantage, which is multiplied still further by the fact that the screw is twice as far as the bosses 25 are from the tongue and slot engagement between legs 10 which serves as a fulcrum. The saddles 25b generally fit the post 50 to give a good grip.

A tab 26 extends toward the center of the stand from each leg 10 to support the bottom of post 50, as best shown in FIGS. 3 and 5.

As shown in FIG. 6, my novel stand may be assembled using any number of legs 10, as just described, in order to fit a pole of any dimension. It is preferable, but not essential, to form tongue 18 at an angle such that it will lie flush against rib extensions 21 in its assembled position, and to form bosses 24 at a sufficient angle to the plane of leg 10 so that they are at least generally parallel to each other for the insertion of screw 23 or other fastener.

Variations in the form, proportion, and structure of my device may be made within the scope of the appended claims.

I claim:

1. A collapsible stand having a plurality of substantially identical legs, each said leg being provided with an attachment portion, said stand being assembled so that said attachment portions form a polygon, and a pair of vertically spaced post engaging bosses located in said attachment portion, said attachment portion being bounded by a slot at one side and by a tongue on the other side, a pair of vertically spaced horizontally extending ribs extending from one side of said slot to the end of said tongue, said tongue and said slot being so shaped as to be complementary when said tongue is held at an angle to said slot other than the angle which it occupies in assembled relationship, and means for receiving a screw threaded fastener adjacent a said tongue and a said slot.

2. The device of claim 1 in which said post engaging bosses each comprise a pair of raised portions and a saddle between said raised portions shaped to conform generally to the contour of a post which will fit in the space enclosed by the attaching portions of said legs when said legs are assembled to form a polygon.

3. The device of claim 1 in which said slots are each provided with bays to accommodate said ribs.

4. The device of claim 1 in which each leg is provided with a post supporting laterally inwardly extending tab at the bottom margin of said attaching portion.

5. A polygonal stand for supporting a post, said stand comprising a plurality of legs, each leg having an attaching portion, the margins of said attaching portions being secured to the margins of other like attaching portions to form a polygon, an upper annular series of spaced bosses and a lower annular series of spaced bosses, one said boss of said upper series and one said boss of said lower series being vertically spaced on the attaching portion of each said leg, means for engaging each said attaching portion of said leg only when said legs are in a first angular relationship and screw-threaded means for securing all of said legs simultaneously in a different angular relationship, said screw-threaded means being adapted also to apply pressure to a said post between said bosses.

References Cited

UNITED STATES PATENTS

| | | | |
|---|---|---|---|
| 1,757,548 | 5/1930 | Sohissler | 248—346 X |
| 2,452,792 | 11/1948 | Roberts | 248—48 |
| 2,461,748 | 2/1949 | Looker | 248—48 |
| 2,960,784 | 11/1960 | Frey | 248—230 X |

FOREIGN PATENTS

| | | |
|---|---|---|
| 659,289 | 3/1963 | Canada. |

CHANCELLOR E. HARRIS, *Primary Examiner.*